Patented Aug. 13, 1935

2,011,489

UNITED STATES PATENT OFFICE 2,011,489

MOLD FOR CASTING BASIC REFRACTORIES

Hobart M. Kraner and Frederic W. Schroeder, Louisville, Ky., assignors to Corhart Refractories Company, Louisville, Ky.

No Drawing. Application February 14, 1934, Serial No. 711,276

4 Claims. (Cl. 49—65)

Aluminum silicates, and especially those having a high alumina content, are successfully cast in sand molds or in molds of aluminum silicate. As an example of such practice, United States Patent No. 1,615,750, to Gordon S. Fulcher, may be consulted. If, however, it is attempted to cast basic refractories such as those containing substantial percentages of magnesia and/or lime in sand molds, difficulties are met with due to the reaction of the molten refractory on the mold material at temperatures below the melting point of the latter.

We have discovered that these basic refractories may be successfully cast in molds when made of a siliceous material containing substantially no free silica and not over 50 per cent combined silica. The silica may be combined with various bases, such as alumina, magnesia or lime or combination of these. Thus, as examples of suitable mold substances for the basic refractories we may use Sillimanite ($Al_2O_3$ $SiO_2$ =

$SiO_2$ 36.8%, $Al_2O_3$, 63.2%)
Mullite ($3Al_2O_3$ $2SiO_2$ = $SiO_2$ 28.2%, $Al_2O_3$, 61.8%)
Fosterite ($2MgO$ $SiO_2$ = $MgO$ 57.1%, $SiO_2$, 42.9%)

Such materials may be formed into grains and bonded with oil or other binders as is now practiced with molds of sand. As examples of basic refractories we cite materials containing substantial quantities of magnesia, such as spinel.

Having thus described our invention what we claim as new, and desire to secure by U. S. Letters Patent is:—

1. A mold in which to cast basic molten refractories consisting of a siliceous material containing no substantial quantity of free silica and not more than 50% of combined silica.

2. A mold in which to cast basic molten refractories consisting of a siliceous material containing no substantial quantity of free silica and not more than 50% of combined silica and over 60% of alkaline earths.

3. The herein described process of casting basic molten refractories which comprises flowing the refractory in a molten state into a mold consisting of a siliceous material containing no substantial quantity of free silica and not over 50% of combined silica.

4. The herein described process of casting basic molten refractories which comprises flowing the refractory in a molten state into a mold consisting of a siliceous material containing no substantial quantity of free silica and not over 50% of combined silica, and not over 60% of alkaline earths.

HOBART M. KRANER.
FREDERIC W. SCHROEDER.